(12) United States Patent
Thind et al.

(10) Patent No.: US 7,711,855 B2
(45) Date of Patent: May 4, 2010

(54) METHOD AND DEVICE FOR PROCESSING A TIME-RELATED DATA ENTRY

(75) Inventors: Jasjeet Singh Thind, San Mateo, CA (US); John Leo, Palo Alto, CA (US); Yoram Tal, Foster City, CA (US); Maria Kaval, Menlo Park, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1053 days.

(21) Appl. No.: 10/175,943

(22) Filed: Jun. 19, 2002

(65) Prior Publication Data

US 2007/0239894 A1    Oct. 11, 2007

(51) Int. Cl.
G06F 15/16    (2006.01)

(52) U.S. Cl. ................................ 709/246; 709/248

(58) Field of Classification Search ................. 709/246, 709/248
See application file for complete search history.

(56) References Cited

U.S. PATENT DOCUMENTS

| | | | |
|---|---|---|---|
| 5,054,008 A * | 10/1991 | Darling | 368/27 |
| 6,728,533 B2 * | 4/2004 | Ishii | 455/425 |
| 6,831,970 B1 * | 12/2004 | Awada et al. | 379/201.01 |
| 6,950,662 B2 * | 9/2005 | Kumar | 455/456.3 |
| 2002/0098857 A1 * | 7/2002 | Ishii | 455/502 |
| 2002/0186619 A1 * | 12/2002 | Reeves et al. | 368/47 |
| 2003/0054325 A1 * | 3/2003 | Miller et al. | 434/108 |
| 2003/0110408 A1 * | 6/2003 | Wells et al. | 714/1 |
| 2004/0210568 A1 * | 10/2004 | Makus et al. | 707/3 |
| 2007/0121425 A1 * | 5/2007 | Eble et al. | 368/21 |

* cited by examiner

*Primary Examiner*—Nathan Flynn
*Assistant Examiner*—Mohamed Wasel
(74) *Attorney, Agent, or Firm*—Campbell Stephenson LLP

(57) ABSTRACT

In one implementation, a method includes obtaining a data entry from a user of a device, and obtaining a first time entry related to a first time zone. The first time entry and the first time zone are selected by a user of the device and the device converts the first time entry to a second time in a second time zone associated with a user of the device. The device then stores the data entry with the second time in the device. The method and device can thus be used to schedule a meeting in a selected local time in selected time zone, which is then converted to a local time in a time zone associated with the device.

43 Claims, 9 Drawing Sheets

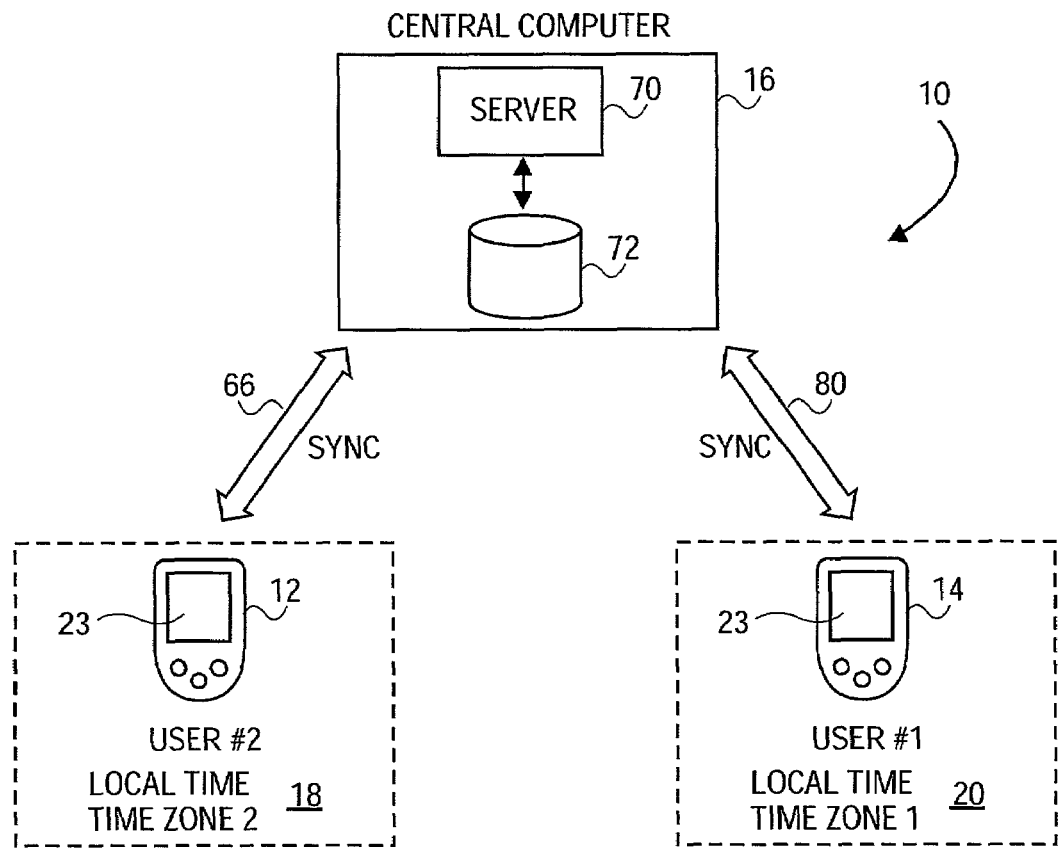

METHOD AND DEVICE FOR PROCESSING A TIME-RELATED DATA ENTRY

FIELD OF THE INVENTION

The present invention relates generally to the field of computer systems and, more specifically, to a method of, and a device for, processing a time-related data entry.

BACKGROUND OF THE INVENTION

Portable computing devices (also referred to herein as handheld devices) such as Personal Digital Assistants (PDAs), Pocket Personal Computers (PPCs), or the like are readily available in the market place. These devices have a substantially smaller form factor than other portable computer devices such as laptop computers and, accordingly, are becoming increasingly popular. Due to their small form factor, they frequently accompany a person during working hours to schedule meetings, read e-mail, and perform a host of other functions.

Notwithstanding, their small form factor, these handheld devices have relatively high processing capabilities and may interact with a variety of more powerful computers, running sophisticated software applications that access large databases. During such interactions, a handheld device typically synchronizes its local content or data with that of another database. Such synchronization operations may relate to newly scheduled meetings or activities, entered by an instructing person but to be performed by another designated person.

However, due to the global and decentralized nature of business, the person instructing or scheduling an activity, and the person designated to perform the activity, may be in different time zones. Thus, an activity scheduled at a particular local time in a handheld device located in one time zone, and subsequently communicated to another handheld device located in another time zone, would not be reflected in the local time of the person designated to perform the activity, but rather in the local time of the person designating the activity.

SUMMARY OF THE INVENTION

A method of, and a handheld computer device for, processing a time-related data entry is provided. The method comprises acquiring the time-related data entry from a user of the device and acquiring a first time entry related to a first time zone. The first time entry and the first time zone are selected by the user of the device whereafter the first time entry is converted to a second time in a second time zone associated with a user of the device. The time-related data entry is then stored with the second time in the device.

Other features of the present invention will be apparent from the accompanying drawings and from the detailed description, which follows.

BRIEF DESCRIPTION OF THE DRAWINGS

The present invention is illustrated by way of example, and not limitation, in the figures of the accompanying drawings, wherein like references indicate similar features and wherein:

FIG. 1 shows a schematic block diagram of an exemplary computer network including a plurality of handheld computer devices, in accordance with an exemplary embodiment of the invention;

FIG. 2 shows an exemplary table stored in a database of a central computer, in accordance with an exemplary embodiment of the invention;

DETAILED DESCRIPTION

Figure 3:
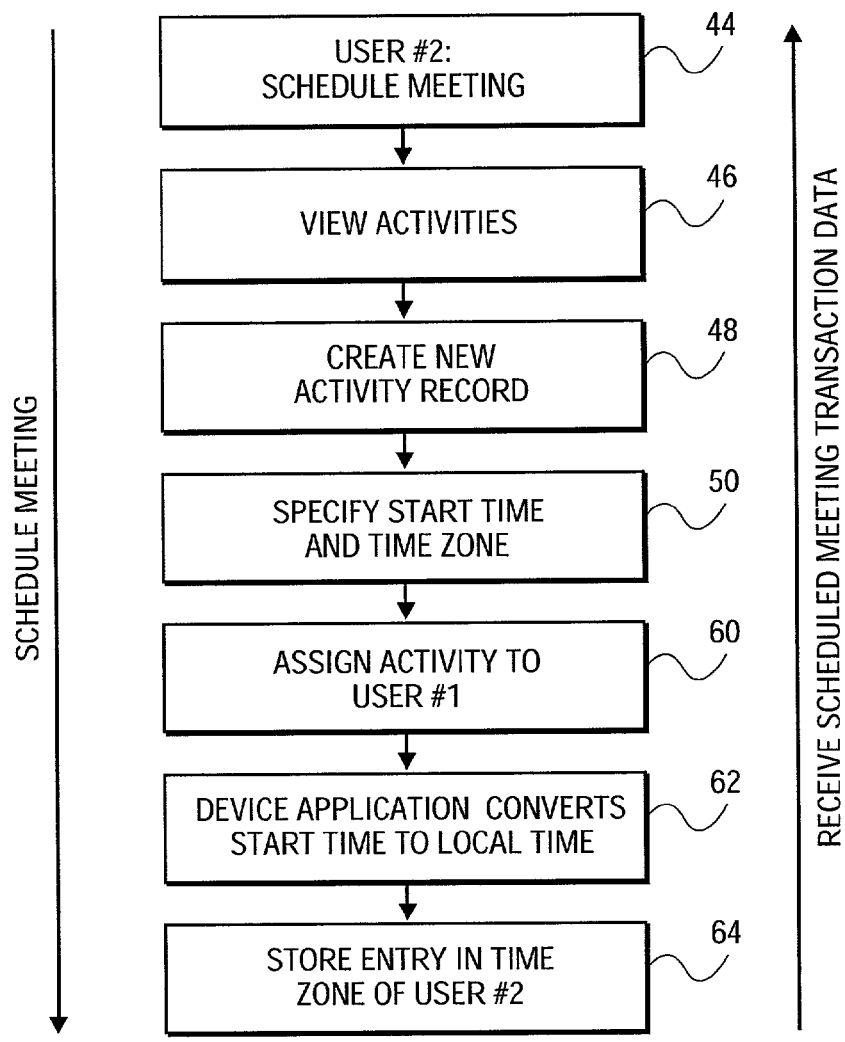
FIG. 3 shows a schematic flow diagram of a method, in accordance with a further exemplary embodiment of the invention, wherein a local time entry in one time zone is converted on a handheld device to a local time in different time zone.

A method and device for, processing a time-related data entry is described. In the following description, for purposes of explanation, numerous specific details are set forth in order to provide a thorough understanding of the present invention. It will be evident, however, to one skilled in the art, that the present invention may be practiced without these specific details.

Referring in particular to FIG. 1, a computer network 10, in accordance with an exemplary embodiment of the invention, includes a plurality of handheld computer devices 12, 14 (only two of which are shown) that are capable of communicating with a central computer 16, also in accordance with an exemplary embodiment of the invention. As described in more detail below, the network 10 allows automatic scheduling of activities or tasks in different time zones. Although the exemplary embodiment is described with reference to the scheduling of activities or tasks, it is to be appreciated that the invention may be applied to any time-related data entry.

The handheld computer devices 12, 14, also in accordance with an exemplary embodiment of the invention, are typically devices having a small form factor such as those commonly available in the market place. Accordingly, first and second users (also referred to herein as user one and user two) usually carry the devices 14, 12 on their person as the devices 12, 14 facilitate the scheduling of tasks or activities that are to be performed.

The device 12 is typically associated with the second user, e.g., a manager, who may want to schedule an activity to be performed by the first user associated with the device 14. However, due to the geographically distributed nature of business, the first and second users may be located in different time zones. Accordingly, time-related data entries reflected in a local time on the device 12 located in a first time zone 18, may require conversion to time-related entries on the device 14, in a local time in a second time zone 20. The exemplary embodiment of the present invention allows for an automated conversion of time in time-related transactions or data entries so that they are displayed and stored on the devices 12, 14 in such a fashion so that time is shown in the appropriate local time, in the particular time zone associated with the geographical location of the respective user of the device 12, 14. Although the invention may be applied to any activity or transaction data that is communicated between users in different time zones, an example of the invention is described below wherein an activity, in the form of an appointment, is scheduled.

Figure 6:
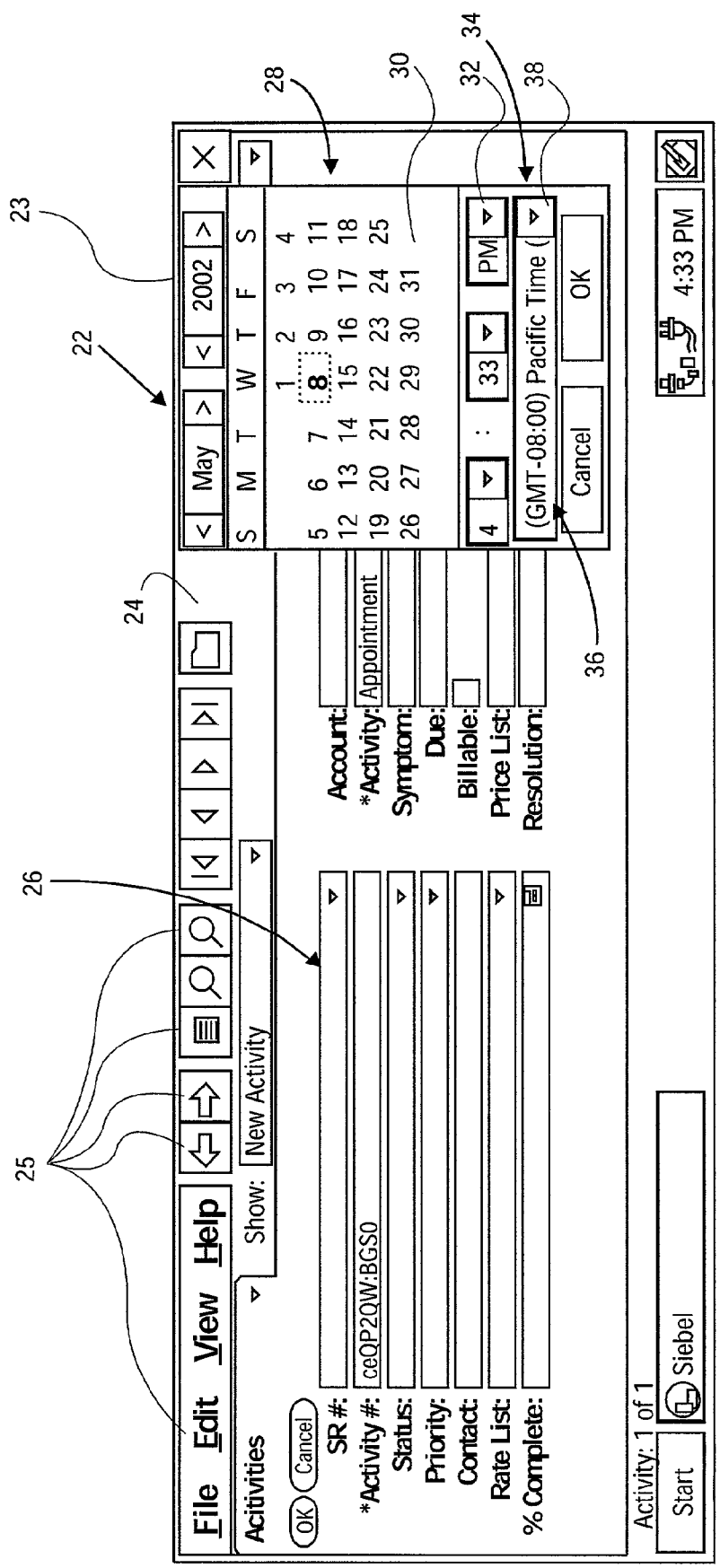
FIGS. 6 and 7 show schematic representations of a user interface, also in accordance an exemplary embodiment of the invention, of a handheld computer device.
Figure 7:
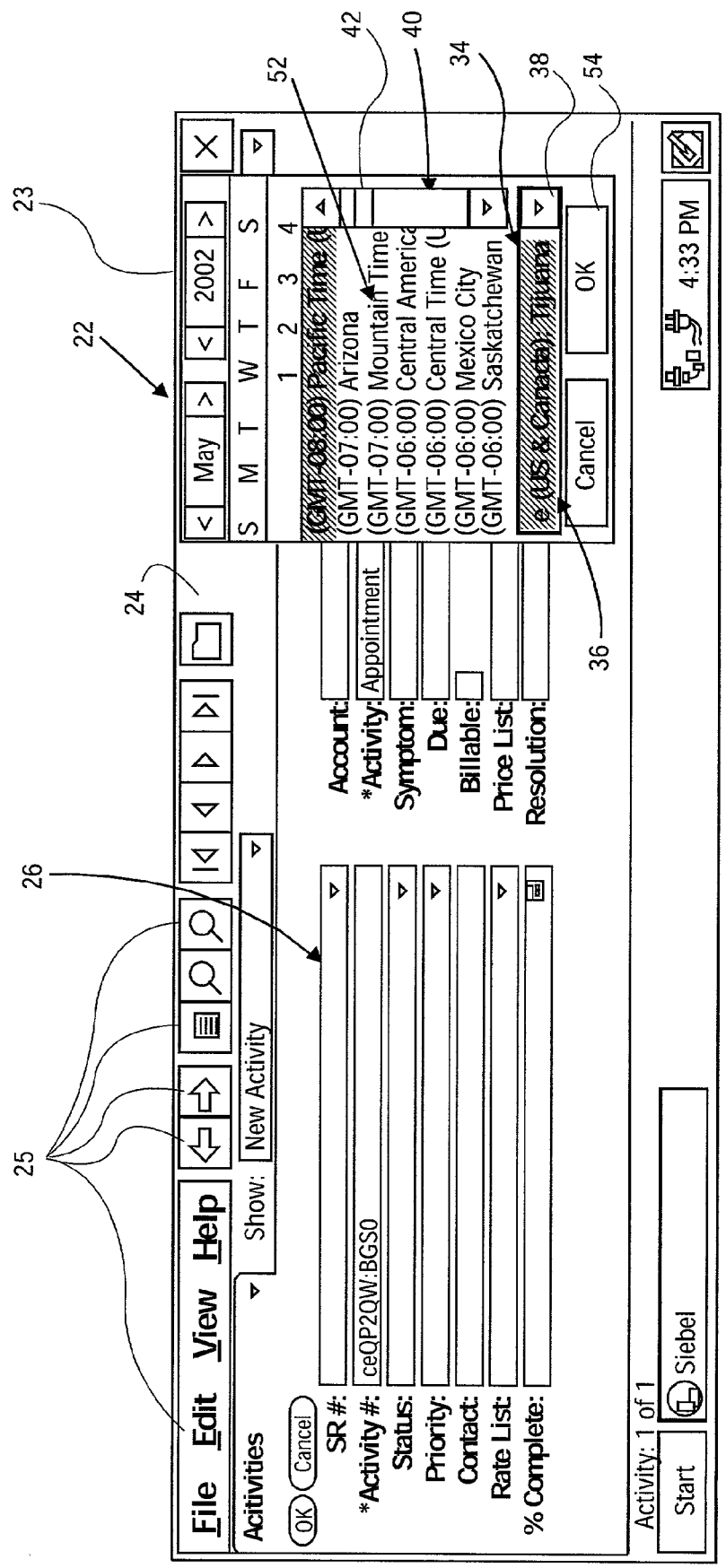

Referring in particular to FIG. 6 and FIG. 7, the devices 12, 14 may have an exemplary user interface 22 provided on a display screen 23. The user interface 22 includes a navigation bar 24, with its associated functionality buttons 25 (only a few of which are referenced in the drawings), as well as a display zone 26 for displaying activity data. In the example depicted in the drawings, activity data associated with an appointment is displayed. However, it is to be appreciated that any time-related data or activities might be provided in the display zone 26. In one embodiment, the time-related data or content requires a user to select a particular date and time associated with the activity, e.g. when the activity must be performed. Accordingly, in FIG. 6 the devices 12, 14, and their user interface modules provide a popup dialog 28 including a calendar 30 with a time entry facility 32. Typically, the user interface 22 is provided on a touch screen of a handheld computer device which defines an input facility.

However, unlike prior art user interfaces, the user interface 22 of the devices 12, 14 of FIG. 1 includes a display area 34 for displaying a particular time zone associated with the calendar 30 and the time entry facility 32. As shown in FIG. 7, in one embodiment, the display area 34 includes a field 36 for displaying the time zone and a drop down menu button 38 which, when activated, generates a time zone selection popup menu 40. The user may select any one of a plurality of time zones from the time zone selection popup menu 40. In certain embodiments, due to the limited screen size of handheld computer devices, only a few of the available time zones can easily be displayed at any given time and, accordingly, a scroll button 42 is provided. In this embodiment, the user may thus scroll through a number of different time zones from which he or she may then select a particular time zone, associated with the person to perform the particular activity being scheduled. Thus, when the person to perform the particular activity is in a different time zone to the user, the user would select this different time zone from the popup menu 40.

For example, referring to FIGS. 1 and 3, assuming that user two is located in the time zone 18 (a second time zone) wishes to schedule a meeting to be performed by user one located in a different time zone 20 (a first time zone) as shown in block 44 in FIG. 3. In block 46, user two would select "View Activities" or a corresponding "Calendar" or the like function on a handheld device. In block 48, user two then creates a new activity record as described in more detail below. It is, however, important to bear in mind that, as user two is in the time zone 18 of FIG. 1, his or her associated device 12 would show local time in that respective time zone, which the device 12 of user two is located. For example, in this embodiment, Pacific Standard Time (PST) would be set as a reference time zone for the device 12. Accordingly, when user two navigates to an activities view of the user interface 22 of FIG. 6, PST is shown as the time zone in the display area 34 of the device 12.

In block 50 of FIG. 3, in order to set up the activity for user one located in time zone 20, user two enters the appropriate activity data in a form or dialog provided in the display zone 26 of the user interface 22, shown in FIG. 6. For example, user two may employ a stylus on a touch screen to select a date, month, and year from the calendar 30 as well as a local time at which the activity is to be performed in the first time zone 20. Thus, in this exemplary embodiment, the designating user (user two in the example) does not select the performance time of the activity relative to the time zone wherein user two is located, but relative to a local time in the time zone wherein the designated user (user one) is located.

Once user two has selected time and date information, in the present example, May 8, 2002 at 4:33 p.m. as shown in FIG. 6, user two then activates the drop down menu button 38 of the user interface 22 shown in FIG. 6 in order to select the particular time zone wherein the designated user (user one) is located. As shown in FIG. 7, activation of the drop down menu button 38 provides a list of various time zones on the user interface. For example, if Mountain Time is used in time zone 20, then the Mountain Time entry 52 is highlighted by user two (the designating user), whereafter user two then activates the "OK" button 54. Upon activation of the "OK" button 54, Mountain Time is then displayed in the display area 34 of the user interface 22 of FIG. 6 and, accordingly, Mountain Time would then replace Pacific Standard Time in the display area 34.

In block 60 of FIG. 3, the activity is then assigned to user one whereafter, in block 62, the device 12 converts the local time (Mountain Time) selected by user two in the first time zone 20 to a local time in the second time zone 18 which is the current time on the device 12. Thus, in one embodiment, although user two has selected a local time in a different time zone, in block 64 the time entry in the activity list or calendar of the device 12 reflects the time of the activity in the respective local time of user two.

Figure 4:
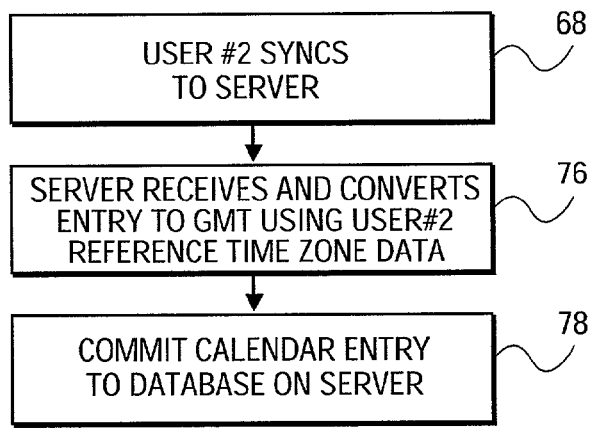
FIGS. 4 and 5 show schematic flow diagrams of a method, also in accordance with a further exemplary embodiment of the invention, wherein the local time entry in one time zone is converted on the central computer to the local time in the different time zone.

Referring to block 68 in FIG. 4 and connection 66 in FIG. 1, when user two synchronizes with the central computer 16, data (including data on the activity) is transferred between the device 12 and the central computer 16. In one embodiment, the central computer 16 of FIG. 1 has a server 70 with an associated database 72 wherein data or information relating to each of users of the devices 12, 14 forming part of the network 10 is stored. For example in one embodiment, the database 72 may include a Table 74 of FIG. 2 that identifies the default time zones of all users using the network 10. As can be seen from the Table 74, Mountain Time is associated with user one, and Pacific Standard Time is associated with user two. Although exemplary embodiments of the invention are described with reference to time zones in the United States of America, the invention is equally applicable to any other time zones, for example, time zones of different international cities or countries, or any combination thereof. Thus, the Table 74 may be used to identify a time difference between a geographic location wherein the user two is located, and a geographic location wherein user one is located.

Once the device 12 of FIG. 1 has synchronized with the central computer 16, in block 76 of FIG. 4 the server 70 converts the time data provided in the transaction record from the device 12 to a central default time zone. In one embodiment, the central default time zone is conveniently Greenwich Mean Time (GMT) and the server 70 stores the time-related transaction records in the database 72 in such a fashion so that times associated with the transactions, received from the device 12, are represented in the central default time zone. In addition to converting the local time of the transaction records received from the device 12 in the time zone 18 to the central default time, to the local time of the device 14 in the time zone 20, the server 70 also processes the transaction records and in block 78 commits the calendar entry or activity created by the device 12, and destined for the device 14, to the database 72. In certain embodiments, time-related transaction records may at this stage be converted to a Universal Time and thereafter converted to a time associated with the user of the device 14.

Figure 5:
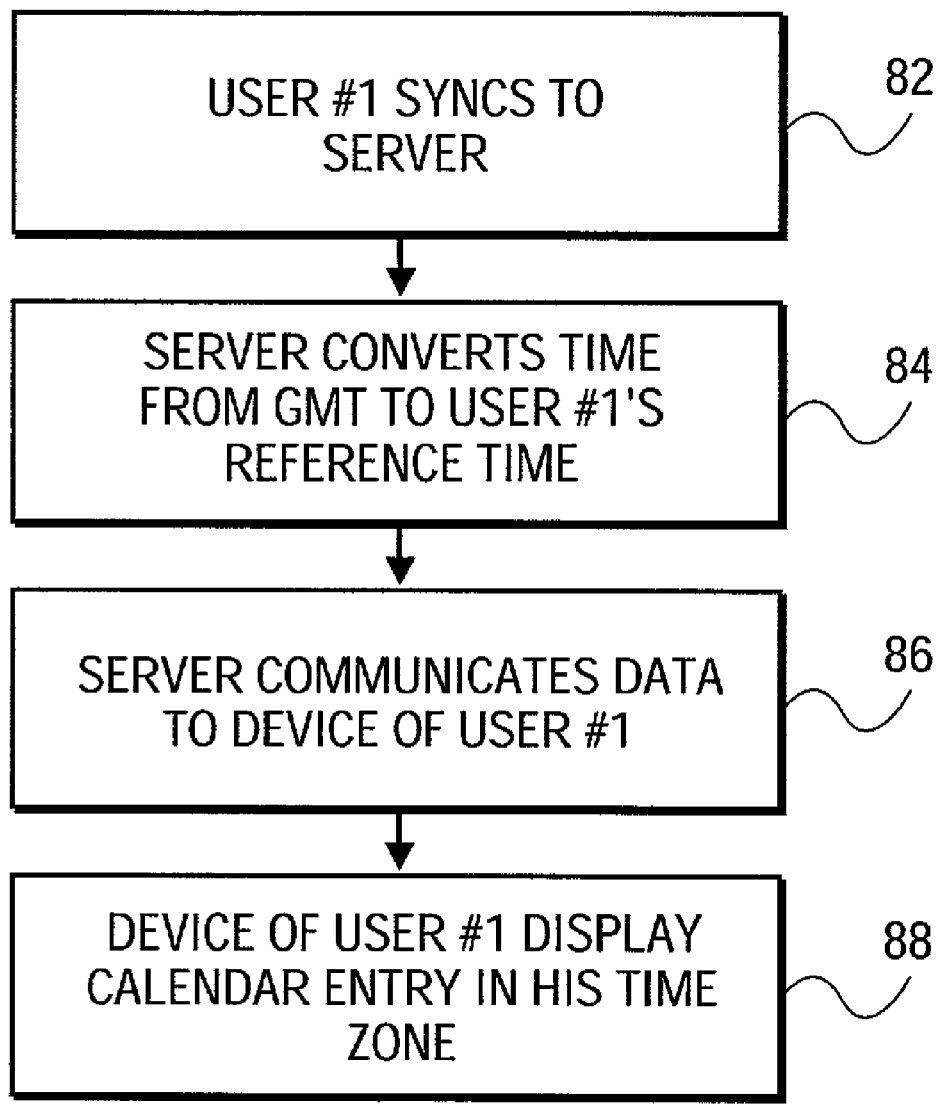

Referring in particular to FIG. 5, in block 82 when user one synchronizes the device 14 with the central computer 16, as shown by connection 80 in FIG. 1, the transaction record associated with the new activity created by user two is sent to the device 14. In one embodiment, the server 70, which stores all transaction records in the default time zone (GMT), interrogates the Table 74 to identify the specific time zone associated with user one, which in the present example, is Mountain Time. In block 84, the server 70 converts the time-related data associated with the transaction record from GMT to local time in Mountain Time that is associated with user one. Thereafter, in one embodiment, the server 70 communicates in block 86 the time-related data to the device 14 as, for example, typically happens during a conventional synchronization operation.

Accordingly, in block 88 when user one views his activities on the device 14, the particular appointment which was created by user two, is shown in user one's calendar 30, not in local time of the first time zone 18, but in local time in the time zone 20.

The device 14 also includes the application software provided on the device 12 to enable user one to schedule an appointment in a similar fashion. In certain embodiments, a plurality of devices 12, 14 may be provided and time-related data may be communicated, via the central computer 16, between any two or more devices. In these embodiments, each user is listed in the Table 74 to identify the particular time zone associated with the user.

It is important however to appreciate that, although the invention has been described with reference to communicating time-related data in the form of calendar or activity entries between the handheld devices 12, 14, any computer devices in different time zones may implement the method. Accordingly, when a meeting is scheduled by a user in a first time zone, the user may select the local time of the meeting or the activity in the second time zone, and when the particular record is transferred to the appropriate user/users, as the case may be, the activity is shown in the calendar of another user/other users in an associated local time zone.

In certain embodiments, the reference time zone for each user is set by the central computer sets 16. For example, as described above the reference time zone of user one is set on the device 14 as Mountain Time and the reference time zone of user two is set as Pacific Standard Time. However, in certain circumstances, user one and user two may travel to a different time zone, which is different from their reference time zone recorded in the Table 74 of FIG. 2. Accordingly, in certain embodiments of the invention, further functionality is provided for users to view activities or information on their associated devices in a time other than their reference time zone. As each device 12, 14 communicates during synchronization using its reference time zone, the Table 74 may be simplified. Thus, in certain embodiments, conversion between different time zones selected by the user takes place on the devices 12, 14 so that the server 70 need only perform a single conversion to its central default time zone when synchronizing with any device 12, 14.

Figure 10:
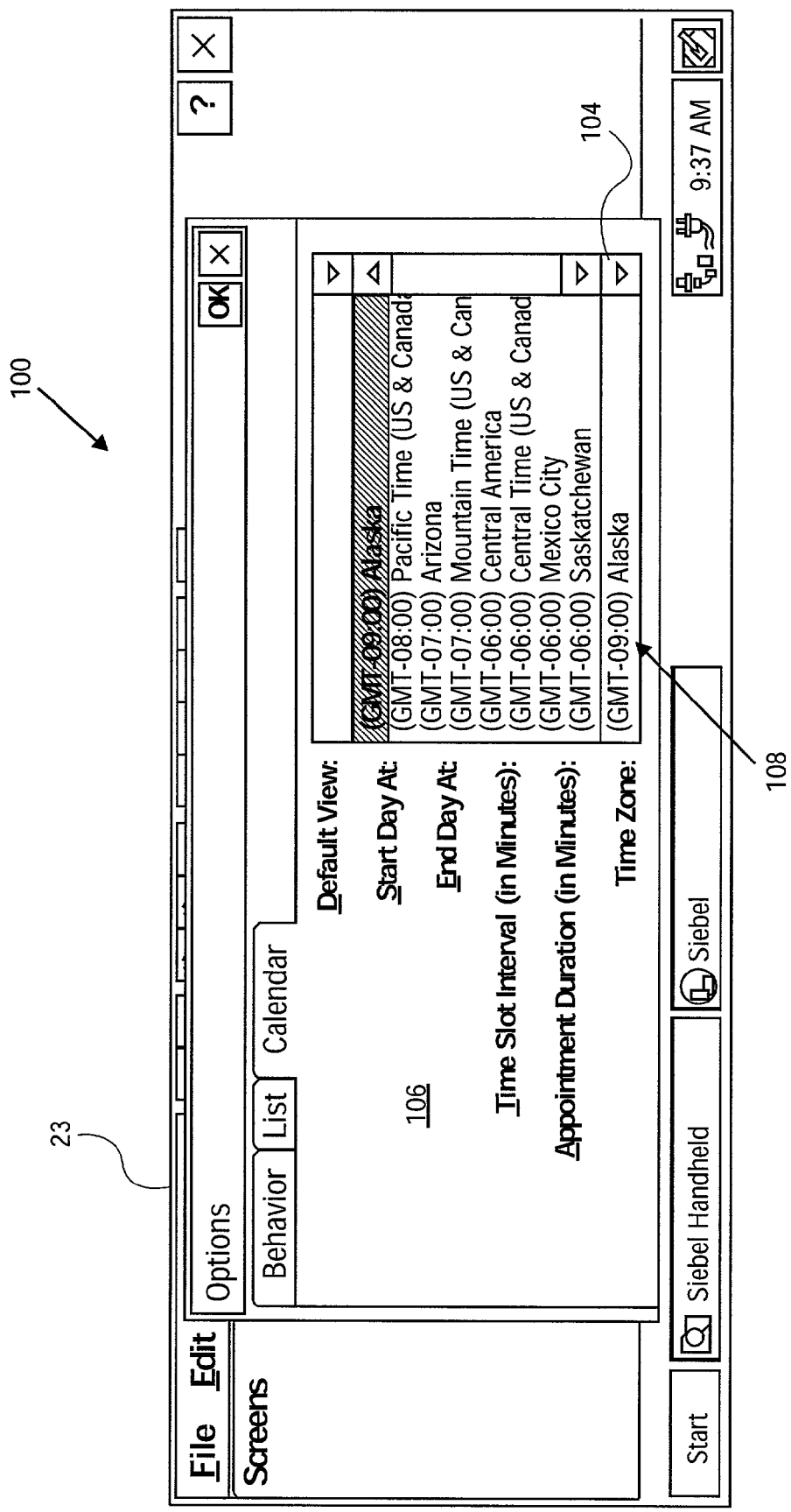
FIGS. 10 and 11 show schematic representations of a user interface associated with the additional functionality shown in FIG. 8.
Figure 11:
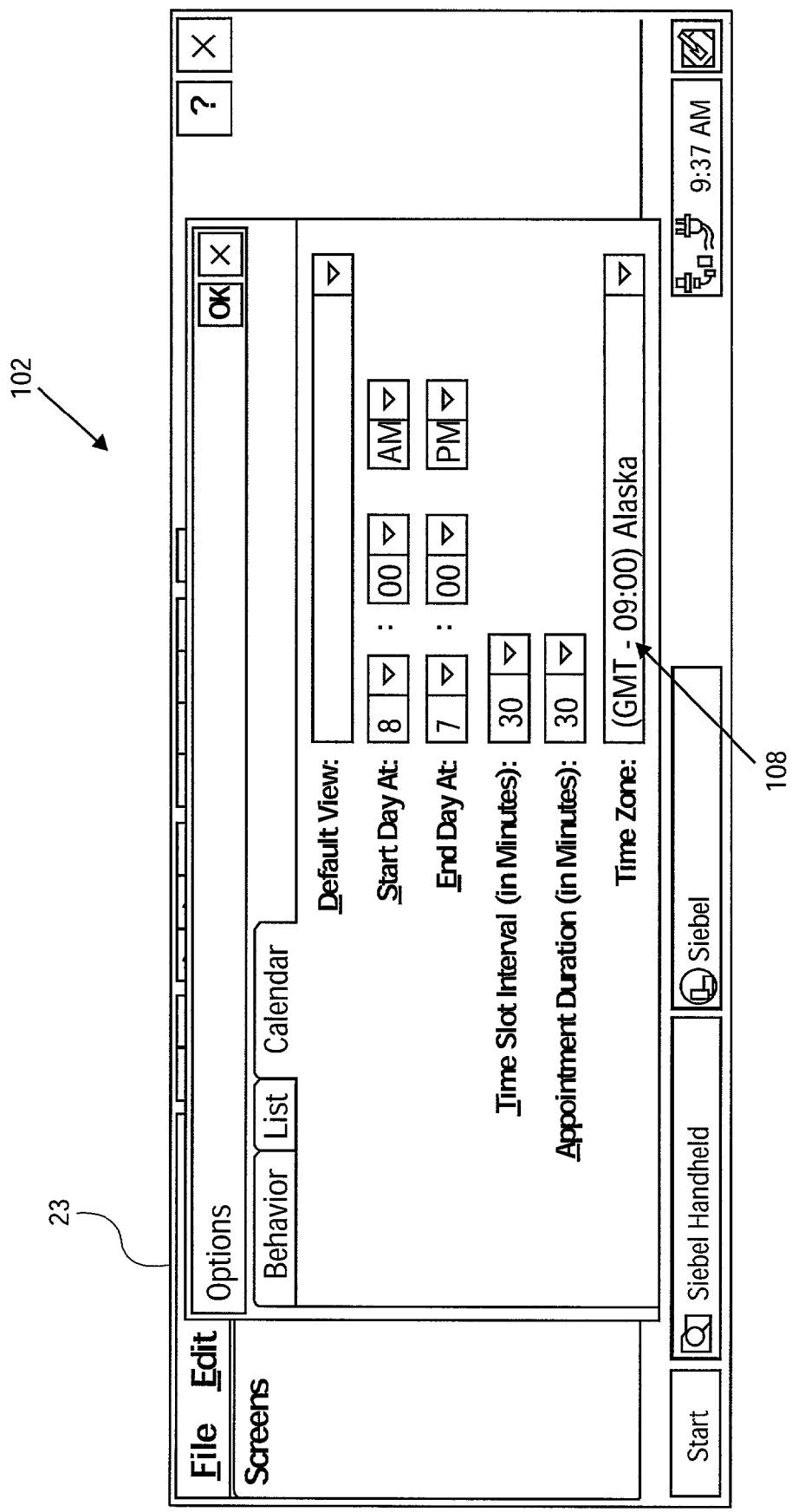
Figure 12:
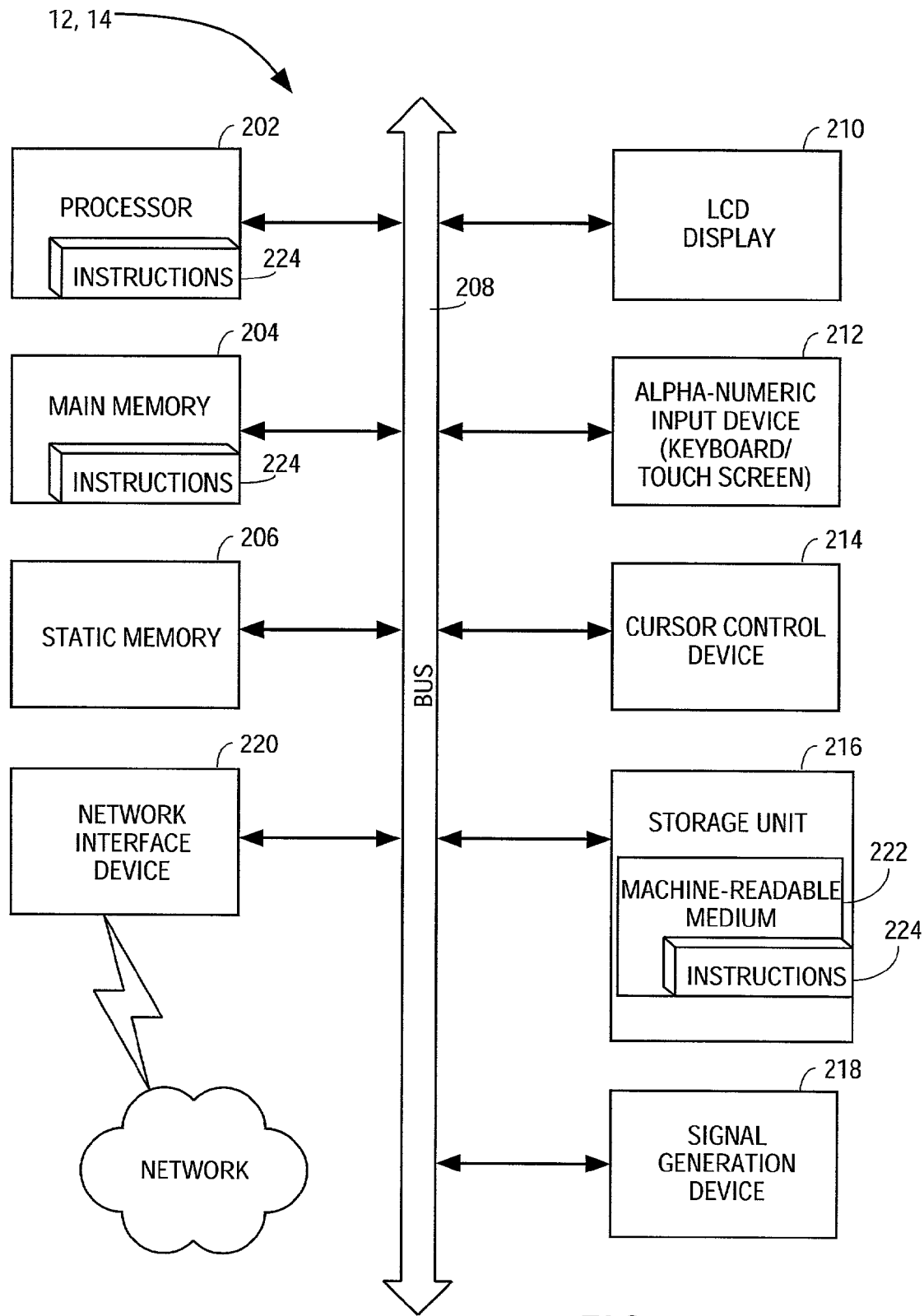
FIG. 12 shows a schematic block diagram of exemplary hardware architecture of the handheld computer device.

Referring in particular to user interfaces 100, 102 of FIGS. 10 and 11 respectively, user two may change the time zone wherein activities are viewed, on the device 12, to a different default display time zone. For example, user two may change the time zone in which activities are viewed when traveling from the user's reference time zone to a different time zone. In the exemplary user interface 100 of FIG. 10, user two may activate a drop down menu button 104 of a calendar screen display 106 and select an appropriate default display time zone, e.g., Alaska, in which time data is to be viewed on the device 12 of FIG. 1. In one embodiment, the reference time zone associated with the user is not changed, but time data is viewed in the default display time zone selected by the user. Once the default display time zone (e.g., Alaska) has been selected from the user interface of FIG. 10, it is shown in a display zone 108 when the calendar screen display 106 of FIG. 11 is viewed. In a similar fashion, user one can view activities in a selected default display time zone. In one embodiment, the reference time zone associated with a user, which corresponds to the time zone stored in the Table of FIG. 2, is not changed on the device 12, 14 but as described below, a time zone conversion takes place to view an activity in the default display time zone. For example, a user preferences facility of the devices 12, 14 may allow the users to set an appropriate default display time zone in which time-related data is viewed.

Figure 8:
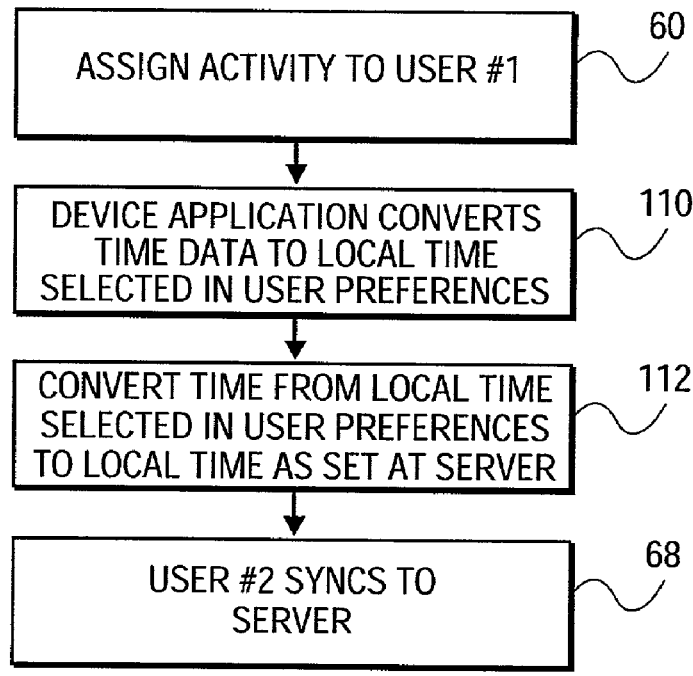
FIG. 8 shows a schematic flow diagram of additional functionality, which may be included in the method illustrated in FIG. 3.

In order to allow user one or user two to view an activity in a different time zone, the method illustrated in FIG. 3 is modified to include the additional functionality described in FIG. 8. In one embodiment, after user two has assigned the activity to user one in block 60 of FIG. 3, in block 110 of FIG. 8 time data, e.g., a start time of the activity, is converted to a local time in the default display time zone that the user has selected to view the time-related transaction records which, in the example provided above, is local time in Alaska. Thereafter in block 112, the time data is converted to a local time in the reference time zone as recorded at the server in the Table 74. Accordingly, when user two synchronizes to the server 70 in block 68, shown in FIGS. 4 and 8, the device 12 communicates time data in a time zone known to the server 70. Thus, in one embodiment, although the user may select an appropriate time in which time entries are viewed on his or her associated device, time entries are stored on the device in the reference time zone that corresponds to the time zone associated with the user at the central computer 16.

When user one synchronizes with the server 70, the server 70 communicates data to user one in the reference time zone associated with user one as described above with reference to Table 74 of FIG. 2. However, in one embodiment, as in the example provided above, user one can view time data in a time zone other than user one's reference time zone, which is Mountain Time in the example described above.

Figure 9:
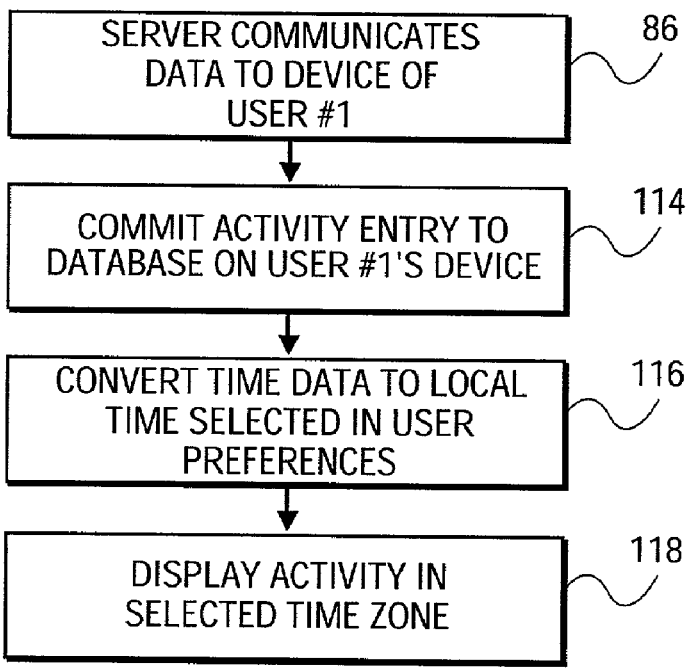
FIG. 9 shows a schematic flow diagram of additional functionality, which may be included in the method illustrated in FIG. 4.

Referring to FIG. 9, in block 86 the server communicates the transaction record with its time-related data to the device 14 of user one in Mountain Time as defined in the Table 74 of FIG. 2. Thereafter, in block 114 all transaction records received from the central computer 16 are committed to a database on the device 14. When user one views time-related data, such as the activity, in block 116 the time-related data in the reference time zone Mountain Time is converted to an appropriate default display time zone selected by user one e.g., selected in the preferences facility, as described above. Accordingly, when the time-related data entry or transaction record is displayed in block 118, the time is shown in local time in the selected time zone. Accordingly, in certain embodiments, user one may travel to different time zones and select the appropriated default display time zone where he or she is located as the time zone in which to display time-related data such as a calendar entry.

FIG. 13 shows a diagrammatic representation of machine in the exemplary form of the handheld computer devices 12, 14 within which a set of instructions, for causing the machine to perform any one of the methodologies discussed above, may be executed.

The devices 12, 14 include a processor 202, a main memory 204, and a static memory 206, which communicate with each other via a bus 208. The devices 12, 14 further include a display unit 210 (e.g., a liquid crystal display (LCD) with a display screen). The devices 12, 14 also include an alphanumeric input device or facility 212 (e.g. a keyboard or touch screen), a cursor control device 214 (e.g. a mouse), a signal generation device 218 (e.g. a speaker), a network interface device 220, and optionally also include an add-on storage unit 216.

The add-on storage unit may define a machine-readable medium 222 in which is stored a set of instructions or applications 224 embodying any one, or all, of the methodologies described above. However, the applications 224 typically reside within the main memory 204 and/or within the processor 202. The applications 224 may further be transmitted or received via the network interface device 220. For the purposes of this specification, the term "machine-readable storage medium" shall be taken to include any medium which is capable of storing a sequence of instructions for execution by the machine and that cause the machine to perform any one of the methodologies of the present invention. The term "machine-readable storage medium" shall accordingly be taken to included, but not be limited to, solid-state memories, optical disks, and magnetic disks.

Thus, a method of, and handheld computer device for, processing a time-related data entry have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method comprising:
    receiving a user input, wherein
        the user input comprises
            a time-related data entry, and
            a first time associated with the time-related data entry,
        the first time represents a time in a first time zone,
        the first time zone is a time zone of a first device,
        the user input is entered by a user into a second device that is separate from the first device, and
        the first time does not represent a local time for the second device;
    converting the first time to a second time, wherein
        the converting is performed by the second device,
        the second time represents a time in a second time zone, and
        the second time zone is a time zone of the second device; and
    storing the time-related data entry in association with the second time.

2. The method of claim 1, wherein the second time is a current time of the second device, the second time zone is a local time zone for the second device, and the user input specifies a time that is local with respect to the first device.

3. The method of claim 2, comprising:
    displaying a calendar showing time and date data to facilitate selection of the first time and a date by a user of the second device, and displaying a plurality of time zones from which the first time zone is selectable.

4. The method of claim 1, wherein the second device is a handheld computer device, the time-related data entry relates to an activity to be performed at the first time for the first time zone.

5. The method of claim 1, wherein the second device is a handheld computer device capable of synchronizing with a central computer, and the method comprising:
    communicating the stored time-related data entry with the second time to the central computer upon synchronization.

6. The method of claim 1, comprising:
    identifying a default display time zone; and
    displaying the time-related data entry in the default display time zone.

7. The method of claim 6, comprising:
    converting the second time to a time relative to the default display time zone.

8. The method of claim 1, comprising:
    transmitting the time-related data entry and the second time from the second device to a central computer, wherein:
        the central computer stores a table that associates a plurality of default time zones with a plurality of corresponding users, the plurality of default time zones comprising the first time zone and the second time zone,
        the user input is received through an interface that comprises a drop-down menu button activated by a stylus on a touch screen of the second device,
        the user input specifies a time that is local with respect to the first device,
        the user input comprises an input of the first time zone through the drop-down menu button on the second device,
        the time specified by the user input is a time at which an activity is to be performed by a first user of the first device, and
        the time-related data entry describes the activity;
    using the table to convert the second time to a central default time;
    using the table to convert the central default time to an output first time for the first time zone of the first user of the first device;
    transmitting the time-related data entry and the output first time from the central device to the first device; and
    displaying the time-related data entry and the output first time in a calendar on the first device.

9. The method of claim 1, comprising:
    transmitting the time-related data entry and the second time from the second device to a central computer, wherein:
        the central computer stores a table that associates a plurality of default time zones with a plurality of corresponding users, the plurality of default time zones comprising the first time zone and the second time zone.

10. A method comprising:
    receiving time-related data to be communicated between a first remote computer device and a second remote computer device, wherein;
        the second remote computer device is separate from the first remote computer device,
    receiving a time, wherein
        the time is associated with the time-related data,
        the time was received as a user input into the second remote computer device, and
        the time did not represent a local time for the second remote computer device;
    retrieving a first reference time zone associated with a user of the first remote computer device;
    retrieving a second reference time zone associated with a user of the second remote computer device;
    converting the time from the first reference time zone to the second reference time zone; and transmitting the time and the time-related data to the first remote computer device.

11. The method of claim 10, comprising:
converting the time-related data from the first reference time zone to a central default time zone associated with a central computer; and
converting the time-related data from the central default time zone to the second reference time zone.

12. The method of claim 10, comprising:
receiving the time-related data from the second remote computer device when the second remote computer device synchronizes with a central computer, and
transmitting the converted time-related data to the first remote computer device when the first remote computer device synchronizes with the central computer.

13. A machine-readable storage medium comprising instructions encoded therein, the instructions comprising:
a plurality of instructions that, when executed by a processor, implement a method, the method comprising:
receiving a user input, wherein
the user input comprises
a time-related data entry, and
a first time associated with the time-related data entry,
the first time represents a time in a first time zone,
the first time zone is a time zone of a first device,
the user input is entered by a user into a second device that is separate from the first device, and
the first time does not represent a local time for the second device;
converting the first time to a second time, wherein
the converting is performed by the second device,
the second time represents a time in a second time zone, and
the second time zone is a time zone of the second device; and
storing the time-related data entry in association with the second time.

14. The machine-readable storage medium of claim 13, wherein the second time is a current time of the second device and the second time zone is a reference time zone associated with a user of the second device.

15. The machine-readable storage medium of claim 14, wherein the method comprises:
providing a display with a calendar showing time and date data to facilitate selection of the first time and a date by the user of the second device, and providing a plurality of time zones from which the first time zone is selectable.

16. The machine-readable storage medium of claim 13, wherein:
the second device is a handheld computer device, and the time-related data entry relates to an activity to be performed at the first time for the first time zone.

17. The machine-readable storage medium of claim 13, wherein:
the second device is a handheld computer device capable of synchronizing with a central computer, and the stored time-related data entry with the second time is communicated to the central computer upon synchronization.

18. The machine-readable storage medium of claim 13, wherein the method comprises:
identifying a default display time zone; and
displaying the time-related data entry in the default display time zone.

19. The machine-readable storage medium of claim 18, wherein the method comprises:

converting the second time to a time relative to the default display time zone.

20. The machine-readable storage medium of claim 13, comprising:
at least one medium selected from the group consisting of: a solid-state memory, an optical disk, and a magnetic disk.

21. A computer program product comprising a machine-readable storage medium and instructions encoded therein, the instructions comprising:
a plurality of instructions that, when executed by a processor, cause the processor to:
receive time-related data to be communicated to a first remote computer device;
receive a time associated with time-related data, wherein
the time was received as a user input into a second remote computer device,
the second remote computer device is separate from the first remote computer device, and
the time did not represent a local time for the second remote computer device and
retrieve a first reference time zone associated with a user of a first remote computer device;
retrieve a second reference time zone associated with a user of the second remote computer device, and
convert the time from the first reference time zone to the second reference time zone.

22. The computer program product of claim 21, wherein time-related data is communicated between first and second remote computer devices and the plurality of instructions cause the processor to:
convert the time-related data from the first reference time zone to a central default time zone; and
convert the time-related data from the central default time zone to the second reference time zone.

23. The computer program product of claim 21, wherein the plurality of instructions cause the processor to:
receive time-related data from the second remote computer device when the second remote computer device synchronizes with the system, and
transmit the converted time-related data to the first remote computer device when the first remote computer device synchronizes with a central computer.

24. A handheld computer device for processing a time-related data entry, the device comprising:
memory wherein instructions are stored;
an input facility configured to
acquire a first time as a user input, and
acquire a first time zone as a user input, wherein
the first time corresponds to the first time zone,
the first time zone is different from a local time zone for the device, and
the first time is related to the time-related data entry; and
a processor configured to execute the instructions to
convert the first time to a second time, wherein
the second time corresponds to a second time zone, and
the second time zone is different from the first time zone, and
store the time-related data entry in association with the second time in the device.

25. The device of claim 24, wherein the second time is a current time of the device and the second time zone is the local time zone for the device.

26. The device of claim 24, comprising:
a display screen configured to display a calendar showing time and date data to facilitate selection of the first time and a date by a user, and
display a plurality of time zones from which the first time zone is selectable.

27. The device of claim 26, wherein the display screen is a touch screen which defines the input facility.

28. The device of claim 24, wherein the time-related data entry is an activity to be performed at the first time for the first time zone.

29. The device of claim 24, wherein the device is capable of synchronizing with a central computer, and the stored time-related data entry with the second time is communicated to the central computer upon synchronization.

30. The device of claim 24, wherein a default display time zone is provided for selection by a user, and the time-related data entry is displayed to the user using the default display time zone.

31. The device of claim 30, wherein the processor converts the second time to the default display time zone.

32. A system comprising:
a database comprising time zone data of a plurality of time zones; and
a server coupled to the database and configured to:
communicate with a first remote computer device and with a second remote computer device;
receive time-related data from the second remote computer device, wherein
the time-related data is to be communicated to the first remote computer device,
the second remote computer device is separate from the first remote computer device,
the time-related data comprises a first time that was received as a user input into the second remote computer device,
the user input into the second remote computer device represented a local time for the first remote computer device, and
the user input into the second remote computer device did not represent a local time for the second remote computer device;
transmit the time-related data to the first remote computer device;
retrieve, from the database, a first reference time zone associated with a user of the first remote computer device;
retrieve, from the database, a second reference time zone associated with a user of the second remote computer device;
convert the time-related data from the first reference time zone to the second reference time zone; and
store the converted time-related data for generating an output display.

33. The system of claim 32, wherein the server is configured to:
convert the time-related data from the first reference time zone to a central default time zone associated with the system; and
convert the time-related data from the central default time zone to the second reference time zone.

34. The system of claim 32, wherein the server is configured to:
receive time-related data from the second remote computer device when the second remote computer device synchronizes with the system, and
transmit the converted time-related data to the first remote computer device when the first remote computer device synchronizes with the system.

35. A handheld computer device for processing a time-related data entry, the device comprising:
means for storing computer-readable instructions;
means for acquiring a user input, wherein the user input comprises:
a first time, and
a first time zone, wherein
the first time corresponds to the first time zone,
the first time zone is different from a local time zone for the device, and
the first time is related to the time-related data entry;
a processor configured to convert the first time to a second time, wherein
the second time corresponds to a second time zone, and
the second time zone is different from the first time zone;
means for storing the time-related data entry, in association with the second time, in the device.

36. A machine-readable storage medium having encoded therein a plurality of instructions that, when executed on a handheld computer device, cause the handheld computer device to implement a method, the method comprising:
receiving a user input, wherein
the user input comprises
a time-related data entry, and
a first time associated with the time-related data entry,
the first time represents a time in a first time zone,
the first time zone is a time zone of a remote device that is separate from the handheld computer device,
the user input is entered by a user into the handheld computer device, and
the first time does not represent a local time for the handheld computer device;
converting the first time to a second time, wherein
the converting is performed by the handheld computer device,
the second time represents a time in a second time zone, and
the second time zone is a time zone of the handheld computer device; and
transmitting the time-related data entry with the second time to the remote device.

37. The machine-readable storage medium of claim 36, wherein the second time is a current time of the handheld computer device and the second time zone is a local time zone for the handheld computer device.

38. The machine-readable storage medium of claim 37, wherein the method comprises:
displaying a calendar on the handheld computer device showing time and date data to facilitate selection of the first time and a date by a user of the handheld computer device, and provides a plurality of time zones from which the first time zone is selectable.

39. The machine-readable storage medium of claim 36, wherein the time-related data entry relates to an activity to be performed at the first time for the first time zone.

40. The machine-readable storage medium of claim 36, wherein:
the handheld computer device synchronizes with the remote device, and
the stored time-related data entry with the second time is communicated to the remote device upon synchronization.

41. The machine-readable storage medium of claim 36, wherein the method comprises:
identifying a default display time zone; and
displaying the time-related data entry in the default display time zone on the handheld computer device.

42. The machine-readable storage medium of claim 41, wherein the method comprises:
  converting the second time to a time relative to the default display time zone.

43. The method of claim 11, wherein the central default time zone is Greenwich Meantime Time (GMT).

* * * * *